United States Patent
Yenganti et al.

(10) Patent No.: US 8,971,229 B1
(45) Date of Patent: Mar. 3, 2015

(54) SYSTEMS AND METHODS FOR WLAN POWER MANAGEMENT

(71) Applicant: QUALCOMM Incorporated, San Diego, CA (US)

(72) Inventors: Pradeep Kumar Yenganti, Sunnyvale, CA (US); Rahul Jammula, Hyderabad (IN); Sriman Miryala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/048,980

(22) Filed: Oct. 8, 2013

(51) Int. Cl.
G08C 17/00 (2006.01)
H04W 52/02 (2009.01)

(52) U.S. Cl.
CPC ................... *H04W 52/0216* (2013.01)
USPC .......................................... 370/311

(58) Field of Classification Search
CPC combination set(s) only.
See application file for complete search history.

(56) References Cited

U.S. PATENT DOCUMENTS

| | | | |
|---|---|---|---|
| 6,917,598 B1 | 7/2005 | Emeott et al. | |
| 8,098,614 B1 | 1/2012 | Wang | |
| 8,203,985 B2 | 6/2012 | Gong et al. | |
| 8,315,193 B2 | 11/2012 | Chhabra | |
| 2006/0193296 A1 | 8/2006 | Zhong et al. | |
| 2007/0104201 A1* | 5/2007 | Wentink et al. | 370/392 |
| 2007/0242634 A1* | 10/2007 | Calcev et al. | 370/318 |
| 2007/0242645 A1* | 10/2007 | Stephenson et al. | 370/338 |
| 2008/0146253 A1* | 6/2008 | Wentink | 455/458 |
| 2009/0252135 A1* | 10/2009 | Benveniste | 370/338 |
| 2009/0310578 A1* | 12/2009 | Convertino et al. | 370/338 |
| 2009/0310618 A1* | 12/2009 | Carter | 370/449 |
| 2010/0067423 A1* | 3/2010 | Sun et al. | 370/311 |
| 2010/0189024 A1* | 7/2010 | Xhafa et al. | 370/311 |
| 2010/0214942 A1* | 8/2010 | Du et al. | 370/252 |
| 2011/0072285 A1* | 3/2011 | Fischer et al. | 713/320 |
| 2012/0188925 A1* | 7/2012 | Lee et al. | 370/311 |

\* cited by examiner

*Primary Examiner* — Clemence Han
(74) *Attorney, Agent, or Firm* — Bay Area Technology Law Group PC

(57) ABSTRACT

Systems and methods are provided for coordinating power management states in a wireless communications device. An access point may buffer data for a station and may then initiate transfer of the buffered data to the station when the station is considered to be in active mode. The access point may transmit each of the one stored data frames with a more data indication when at least one additional frame is buffered and with a no more data indication when no additional frames are buffered. Receipt of the terminal frame including the no more data indication allows the station to return to power save mode without waiting for any timeout period and without risking missing a transmission from the access point.

17 Claims, 5 Drawing Sheets

SYSTEMS AND METHODS FOR WLAN POWER MANAGEMENT

FIELD OF THE PRESENT DISCLOSURE

The present disclosure generally relates to wireless communications and more particularly relates to systems and methods for managing power in a client station (STA) associated with an access point (AP).

BACKGROUND

Wireless Local Area Network (WLAN) devices, such as those conforming to Institute for Electrical and Electronic Engineers (IEEE) 802.11 protocols, may utilize a power management technique that coordinates delivery of data through the use of a traffic indication message (TIM). When a STA is in power save mode and is unable to actively receive data, data may be buffered for later transmission at the AP. The AP indicates the availability of buffered data pending transmission by sending a TIM at regularly scheduled intervals. A STA in power save mode awakens to receive the TIM and upon determining that buffered data is pending, sends a power save poll (PS-Poll) frame to the AP. Receipt of a PS-Poll frame does not change the power management status associated with the STA and the AP continues to classify the STA as being in power save mode. Thus, the AP transmits the first pending data frame in response to the PS-Poll frame. Rather than waiting for the next TIM interval, the AP may signal the STA when additional data is pending by setting the More Data bit of the packet header to signal its availability. Correspondingly, when the STA receives a data frame with the More Data bit set, it may send subsequent PS-Poll frames to individually trigger the transfer of additional frames until it receives a data frame in which the More Data bit is not set, thus informing the station that all currently buffered data has been delivered.

Under this implementation, an undesirable overhead may be imparted to the system due to the requirement that the STA send separate PS-Poll frames to initiate the transfer of each data frame, consuming bandwidth and transmission opportunities for other nodes in the network. To address this issue, the STA may instead signal a change in power management status. Rather than a PS-Poll frame, the STA may unset the Power Management bit in the header of a frame sent to the AP, indicating that it is exiting power save mode. Upon receipt of this frame, the access point then associates an active status with the STA and may deliver all pending data frames without prompting from the station.

However, under conventional 802.11 protocols, there is no provision for the AP to use the More Data bit when communicating with a STA that is in active mode under normal circumstances. As a result, a STA in active mode has no means for determining whether there is data pending transmission at the AP and a delay in returning to power save mode may be imparted. For example, the station may not return to power save mode until an inactivity timeout period has lapsed. The timeout period is typically set to a sufficiently long duration to accommodate any delays in transmission of pending data from the AP, such as when the network is congested and the AP has to contend for access to the medium. Accordingly, the STA may remain in active mode for the inactivity timeout period even though there may be no additional buffered traffic at the AP, representing an undesirable consumption of power.

In addition to the legacy power save mode operation described above, use of the More Data bit to signal completion of buffered traffic delivery has been suggested in other power save contexts. For example, U.S. Pat. No. 6,917,598 describes a legacy power save mechanism triggered by a STA having uplink voice traffic. It is predicated on the assumption that the AP will have a corresponding downlink frame, given that the STA and AP are configured with the same voice frame duration. This patent also describes an improvement in the form of an unscheduled power save delivery (UPSD) mode, that relies on negotiating recurring service periods to ensure a baseline quality of service (QoS) for a reserved access category, such as voice traffic. In both mechanisms, usage of the More Data bit is associated with communications of a certain priority and is limited to defined time periods, either in the form of the voice frame duration or the recurring service period. As such, these techniques are not applicable to the delivery of generic data that may be buffered at the AP.

Accordingly, this disclosure includes systems and methods for providing communication regarding the existence of data for a STA that is buffered at an AP whenever the STA is in active mode. Correspondingly, the STA may efficiently enter power save mode upon determining the buffered data has been delivered.

SUMMARY

This disclosure includes methods to manage power states for a wireless communications device in a wireless local area network (WLAN) that includes at least a first node configured to operate as an access point and a second node configured to operate as a station. For example, one method may involve storing a first data frame from any source in a buffer at the first node for subsequent transmission to the second node, determining by the first node that the second node is in active mode, retrieving the first data frame for transmission to the second node from the buffer, and transmitting the first data frame with a no more data indication when no additional frames for the second node are stored in the buffer. The method may also include storing at least one additional data frame in the buffer and transmitting the at least one additional data frame with a more data indication prior to transmitting the first data frame. In some embodiments, the more data indication comprises a set More Data bit and the no more data indication comprises an unset More Data bit.

In one aspect, the first node may buffer data for the second node in response to receiving a power management indication that the second node is in power save mode or in response to a network condition.

The method may also include transmitting a beacon frame having information indicating availability of buffered data for the second node prior to determining that the second node is in active mode. Further, a power management indication may be received from the second node at the first node signaling that the second node is in active mode, wherein the first node transmits each of the at least one stored data frames in response to receiving the power management indication.

Another suitable method for managing power states in a wireless local area network (WLAN) that includes at least a first node configured to operate as an access point and a second node configured to operate as a station comprises: indicating to the first node that the second node is operating in active mode; receiving at least one data frame from any source at the second node that has been buffered at the first node; maintaining the second node in active mode after receiving a buffered data frame having a more data indication; and transitioning the second node to power save mode after receiving a buffered data frame having a no more data indication. The method may further comprise transmitting from the second node to the first node a power management indication that the second node is in active mode prior to receiving the at least one buffered data frame. The method may also include the second node transmitting the power management indication in response to receiving a beacon frame from the first node having information indicating availability of buffered data for the second node. The method may further include the more data indication comprising a set More Data bit and the no more data indication comprises an unset More Data bit.

This disclosure also includes a wireless communications device configured to operate as an access point in a WLAN having a WLAN transceiver, a buffer and a buffered data controller, such that the wireless communications device may store a first data frame from any source in the buffer for subsequent transmission to a first node, the wireless communications device may determine the first node is in active mode, and the WLAN transceiver may transmit the first data frame with a no more data indication when the buffered data controller determines no additional frames for the first node are stored in the buffer. Further, the WLAN transceiver may store at least one additional data frame in the buffer and transmit the at least additional data frame with a more data indication prior to transmitting the first data frame In one aspect, the wireless communications device may buffer data for the first node in response to receiving a power management indication that the first node is in power save mode or in response to a network condition.

The WLAN transceiver may also transmit a beacon frame having information indicating availability of buffered data for the first node prior to the wireless communications device determining the first node is in active mode. Additionally, the WLAN transceiver may receive a power management indication from the first node signaling that the second node is in active mode, such that the WLAN transceiver may transmit each of the at least one stored data frames in response to receiving the power management indication.

This disclosure also includes a wireless communications device configured to operate as a station in a wireless local area network (WLAN), comprising a WLAN transceiver and a power management controller, wherein: the WLAN transceiver to communicate an indication the wireless communications device is operating in active mode to a first node; the WLAN transceiver to receive at least one data frame from any source that has been buffered at the first node; the power management controller to maintain the wireless communications device in active mode when the WLAN transceiver receives a buffered data frame having a more data indication; and the power management controller to transition the wireless communications device to power save mode when the WLAN transceiver receives a buffered data frame having a no more data indication. The WLAN transceiver may be configured to transmit a power management indication signaling the wireless communications device is in active mode prior to receiving the at least one buffered data frame. The WLAN transceiver may be further configured to transmit the power management indication in response to receiving a beacon frame from the first node having information indicating availability of buffered data for the wireless communications device.

This disclosure further includes a non-transitory processor-readable storage medium for operating a wireless communications device as an access point in a WLAN, the processor-readable storage medium having instructions thereon, when executed by a processor may cause the wireless communications device to store a first data frame from any source in a buffer for subsequent transmission to a first node, to determine that the first node is in active mode, to retrieve the first data frame for transmission to the first node from the buffer, and to transmit the first data frame with a no more data indication when no additional frames for the first node are stored in the buffer. The instructions may also cause the wireless communications device to store at least one additional data frame in the buffer and to transmit the at least one additional data frame with a more data indication prior to transmitting the first data frame In one aspect, the instructions to store at least one data frame may be instructions to buffer data for the first node in response to receiving a power management indication that the first node is in power save mode or in response to a network condition.

Further, the storage medium may include instructions to cause the wireless communications device to transmit a beacon frame having information indicating availability of buffered data for the second node prior to determining that the second node is in active mode. Additionally, the instructions to cause the wireless communications device to transmit each of the at least one stored data frames may cause the transmission in response to the wireless communications device receiving a power management indication signaling that the second node is in active mode.

The disclosure further includes a non-transitory processor-readable storage medium for operating a wireless communications device as a station in a wireless local area network (WLAN), the processor-readable storage medium having instructions thereon, when executed by a processor to cause the wireless communications device to: indicate to a first node that the wireless communications device is operating in active mode; receive at least one data frame from any source that has been buffered at the first node; maintain the wireless communications device in active mode after receiving a buffered data frame having a more data indication; and transition the wireless communications device to power save mode after receiving a buffered data frame having a no more data indication. The storage medium may further comprise instructions to transmit to the first node a power management indication that the wireless communications device is in active mode prior to receiving the at least one buffered data frame. The instructions to transmit the power management indication may cause the transmission, in response to receiving a beacon frame from the first node having information indicating availability of buffered data for the second.

In each of the above noted embodiments of the disclosure, the more data indication may be a set More Data bit and the no more data indication may be an unset More Data bit.

BRIEF DESCRIPTION OF THE DRAWINGS

Further features and advantages will become apparent from the following and more particular description of the preferred embodiments of the disclosure, as illustrated in the accompanying drawings, and in which like referenced characters generally refer to the same parts or elements throughout the views, and in which.

DETAILED DESCRIPTION

Figure 1:
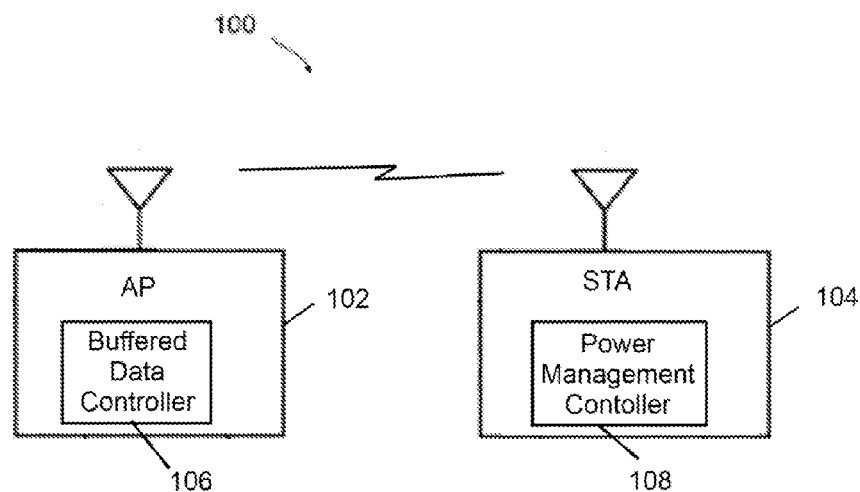
FIG. 1 depicts a wireless communication system, according to one embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Embodiments are described herein with regard to a wireless communications device, which may include any suitable type of user equipment, such as a system, subscriber unit, subscriber station, mobile station, mobile wireless terminal, mobile device, node, device, remote station, remote terminal, terminal, wireless communication device, wireless communication apparatus, user agent, or other client devices. Further examples of a wireless communications device include mobile devices such as a cellular telephone, cordless telephone, Session Initiation Protocol (SIP) phone, smart phone, wireless local loop (WLL) station, personal digital assistant (PDA), laptop, handheld communication device, handheld computing device, satellite radio, wireless modem card and/or another processing device for communicating over a wireless system. Moreover, embodiments may also be described herein with regard to an access point (AP). An AP may be utilized for communicating with one or more wireless nodes and may be termed also be called and exhibit functionality associated with a base station, node, Node B, evolved NodeB (eNB) or other suitable network entity. An AP communicates over the air-interface with wireless terminals. The communication may take place through one or more sectors. The AP may act as a router between the wireless terminal and the rest of the access network, which may include an Internet Protocol (IP) network, by converting received air-interface frames to IP packets. The AP may also coordinate management of attributes for the air interface, and may also be the gateway between a wired network and the wireless network.

Unless defined otherwise, all technical and scientific terms used herein have the same meaning as commonly understood by one having ordinary skill in the art to which the disclosure pertains.

Finally, as used in this specification and the appended claims, the singular forms "a," "an" and "the" include plural referents unless the content clearly dictates otherwise.

The following discussion is in the context of embodiments in which a wireless communications device acting in the role of a STA may be associated with an AP in a WLAN operating under IEEE 802.11 standards. In one aspect, power management may be coordinated through the use of the TIM information element (IE) contained in the periodic beacons transmitted by the access point. Each beacon transmitted by the AP may include TIM information regarding unicast traffic that has been buffered for the STA. In turn, this allows the STA to initiate transfer of the buffered data. These techniques may also be implemented with regard to a delivery TIM (DTIM) IE that may be used by the AP to signal the presence of buffered multicast or broadcast data. The AP typically transmits the broadcast or multicast data following a DTIM without being triggered by the destination STAs. In the discussion that follows, references to TIM information may be taken to include DTIM information as warranted.

The systems and methods of this disclosure may be described in reference to an exemplary wireless communication system 100 as shown in FIG. 1, which includes a first node acting in an access point role, AP 102, and a second node acting in a station role, STA 104. Although discussed in reference to a WLAN, these techniques may also be applied to other network architectures having analogous aspects. Operation of AP 102 in wireless communication system 100 includes the periodic transmission of beacon management frames. The beacon is used to communicate parameters regarding operation of wireless communication system 100, including identification information, supported rates, timing information and the like. The time interval between the start of two consecutive beacons is called a beacon interval and may be used to establish a target beacon transmit time (TBTT). The beacon interval may be fixed or variable and may be set to a suitable duration (e.g., 100 msec).

In one aspect, AP 102 includes buffered data controller 106 that may be configured to employ the More Data bit according to the techniques described herein. Further, STA 104 may include power management controller 108 configured to determine when no additional data frames are pending delivery to expedite entry to power save mode. Buffered data controller 106 and power management controller 108 may be implemented using firmware, software, hardware, or any suitable combination as desired.

As noted above, an AP does not conventionally employ the More Data bit with a STA that is operating in active mode. Typically, the AP sets the More Data bit in a data frame that is transmitted in response to a PS-Poll frame sent by the STA when there is additional buffered data. From the perspective of the AP, the STA remains in power save mode and the AP may not transmit the additional buffered data until polled by the STA. When all the currently buffered data has been delivered, the AP may then unset the More Data bit in the terminal data frame, indicating to the STA that no more data is pending. In contrast, when the STA is in active mode it may not be able to enter power save mode immediately as the AP typically provides no indication that all currently buffered traffic has been delivered. For example, the STA may be configured to delay entry to power save mode for a predetermined period. When there is no activity during that period, the STA may assume all data has been delivered. The predetermined period may be configured to balance competing goals of maximizing power savings and minimizing the chance of missing frames. Correspondingly, at least some potential for power savings must be sacrificed to avoid missing frames.

However, in the systems and methods of this disclosure, the AP may employ the More Data bit when transmitting buffered data to a STA that is considered to be in active mode. For example, STA 104 may send an indication that it is entering active mode, such as in response to receiving a beacon having TIM information signaling that buffered data is pending. AP 102 may then transmit all the buffered data frames sequentially without individual polling. Buffered data controller 106 may be configured to cause data frames to be transmitted with the More Data bit set until the terminal frame is transmitted, which may be transmitted with the More Data bit unset. Upon receipt of each frame, power management controller 108 may parse the frames to determine the state of the More Data bit. When the More Data bit is set, power management controller 108 may cause STA 104 to remain in active mode to receive the additional data frames. When the More Data bit is unset, power management controller 108 may expedite the entry of STA 104 to enter power save mode, substantially avoiding any inactivity timeout period. Accordingly, the techniques of this disclosure represent a more efficient coordination of power management states.

Figure 2:
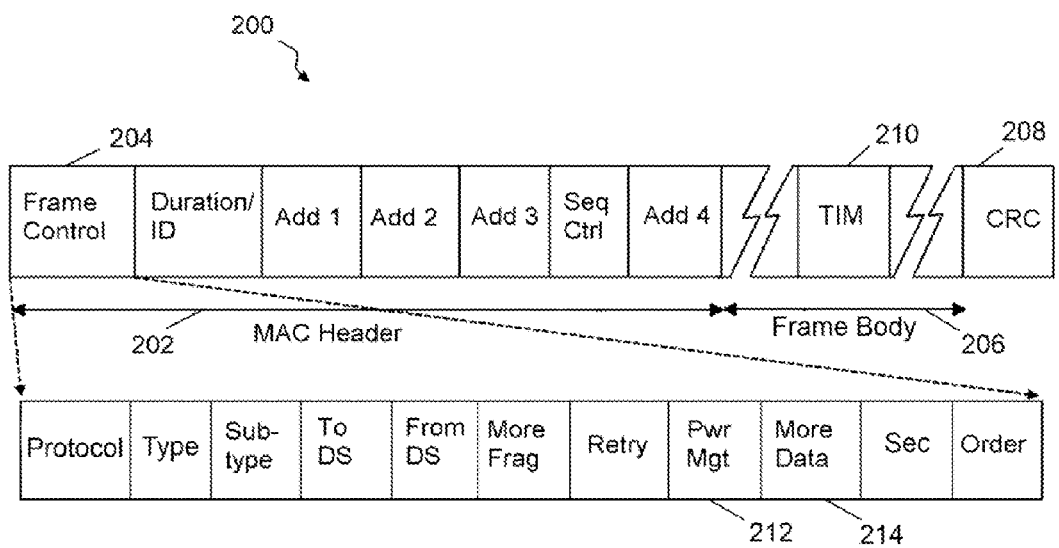
FIG. 2 depicts a generalized format of a transmission frame, according to one embodiment.

An example of a generalized frame 200 that may be used to exchange information between AP 102 and STA 104 according to this disclosure is depicted in FIG. 2. In one example, frame 200 may have a format corresponding to IEEE 802.11 standards and, as shown, may include a MAC header 202 of 18 bytes, containing the frame control 204, duration/ID, address and sequence control fields, a variable length frame body 206 and cyclic redundancy check (CRC) field 208 that provides a frame check sequence (FCS) function. Additional fields, such as a high throughput (HT) field (not shown) may be present depending upon the specific standard being employed. When frame 200 is configured as a beacon frame, frame body 206 may include TIM IE 210 containing either TIM information or DTIM information, depending upon the type of beacon. In current standards (but may not be required in the future), TIM IE 210 typically is the sixth element of frame body 206 and contains a number of fields to help coordinate power save modes with associated stations, such as STA 104, by communicating the presence or absence of buffered unicast and group traffic. For unicast traffic, a virtual bitmap is used to indicate the presence or absence of buffered data for each associated station. Parameters associated with DTIM beacons are communicated using the DTIM Count, which indicates the number of beacons that will be sent before the next DTIM beacon, and the DTIM period, which indicates the number of non-DTIM beacons between DTIM beacons.

The frame control 204 segment of MAC header 202 is also shown in greater detail in FIG. 2, and includes fields providing various types of control information, including an identification of which 802.11 protocol for the frame, the type and subtype of the frame, distribution system information, information regarding additional information to be transmitted, security and order information. Frame control 204 also includes the power management field 212, which may comprise a single bit (or more in other embodiments) and may be used by STA 104 to communicate to AP 102 whether it is in active mode or power save mode. STA 104 may send a management or data frame having the power management bit set to 1 to indicate that it is entering power save mode and may send a frame having the power management bit set to 0 to indicate that it is entering active mode. Frame control 204 may also include More Data field 214, which may comprise a single bit and may be used by AP 102 to communicate to STA 104 whether additional buffered data frames are pending. AP 102 may send a data frame having the More Data bit set to 1 to indicate that at least one additional buffered data frame is pending transmission and may send a frame having the More Data bit set to 0 to indicate that no additional buffered data frames are pending transmission.

Figure 3:
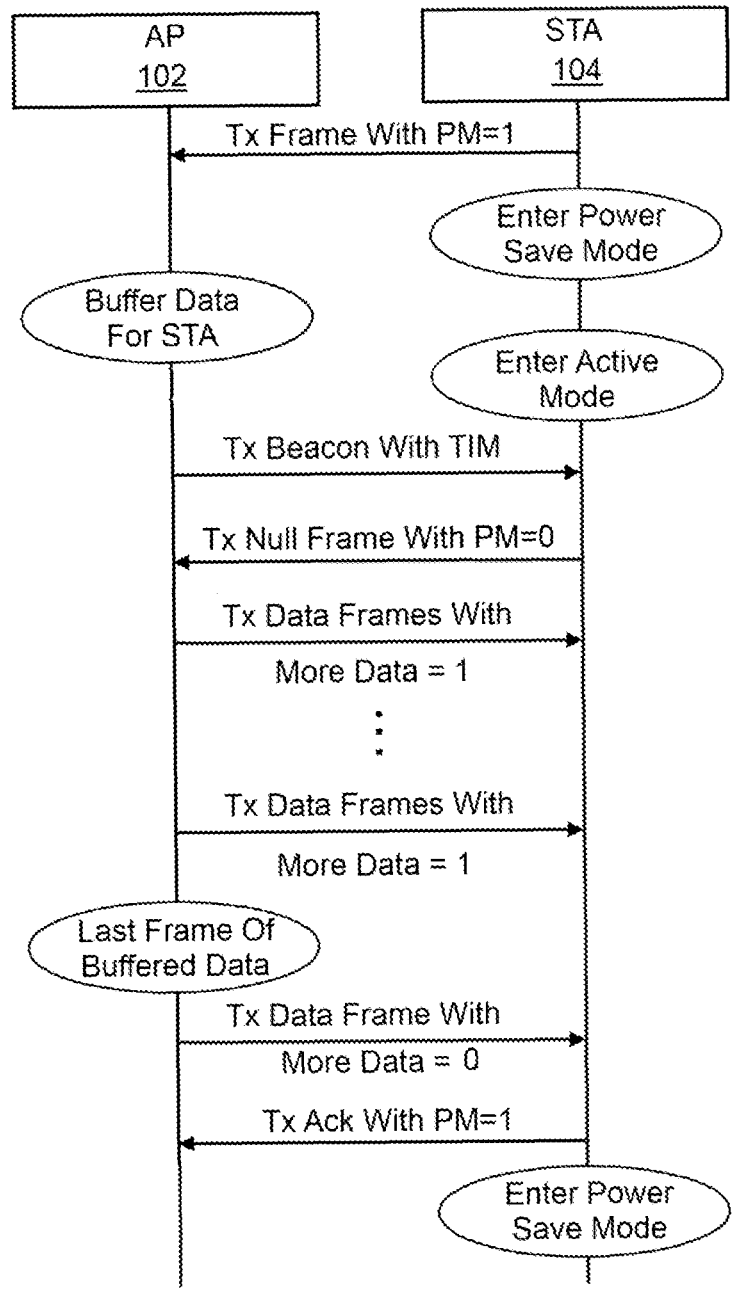
FIG. 3 depicts a sequence diagram of communication between a STA and an AP, according to one embodiment.

An example of the coordination between AP 102 and STA 104 according to the techniques of this disclosure is represented by the sequence diagram depicted in FIG. 3. As shown, STA 104 may signal AP 102 that it is entering power save mode through use of any suitable frame having the power management bit set. AP 102 buffers data when STA 104 is considered to be in power save mode. At a designated time, such as the TBTT, AP 102 may transmit a beacon frame with TIM information indicating the presence of buffered data frames pending transmission to STA 104. STA 104 may return to active mode prior to the TBTT to receive the beacon. Upon processing the TIM information, STA 104 may learn that buffered data is pending and consequently transmit a frame, such as a null frame having the power management bit unset, signaling AP 102 that STA 104 is returning to active state. After receiving notification of the change in power management state of STA 104, AP 102 may transmit buffered data frames. For each transmitted frame, buffered data controller 106 may determine whether additional frames are still pending and cause the More Data bit to be toggled appropriately. For example, when transmitting a terminal data frame such that no additional buffered frames are pending, buffered data controller 106 may cause the terminal frame to have the More Data bit unset. STA 104 may receive the transmitted data frames from AP 102 and power management controller 106 may parse the More Data bit of the received frames. When the More Data bit is set, power management controller 106 may cause STA 104 to remain in active mode to receive the additional pending frames. Upon receipt of the terminal data frame with the More Data bit unset, power management controller 106 may cause STA 104 to return to power save mode, and may signal the change in power management state to AP 102, such as by transmitting an acknowledgement frame having the power management bit unset.

Since STA 104 has a positive indication when all the currently buffered data has been transmitted, return to power save mode is expedited and the need for an inactivity timeout period to run or other delay may be obviated. Correspondingly, the techniques of this disclosure represent a more efficient coordination of power management states for STA 104 when receiving data that has been buffered. These techniques may be applied to buffered data of any access category, allowing for gains in power efficiency regardless of data priority. Further, STA 104 may coordinate its power management states without negotiating defined periods for data exchange in addition to the beacon interval established by AP 102.

Figure 4:
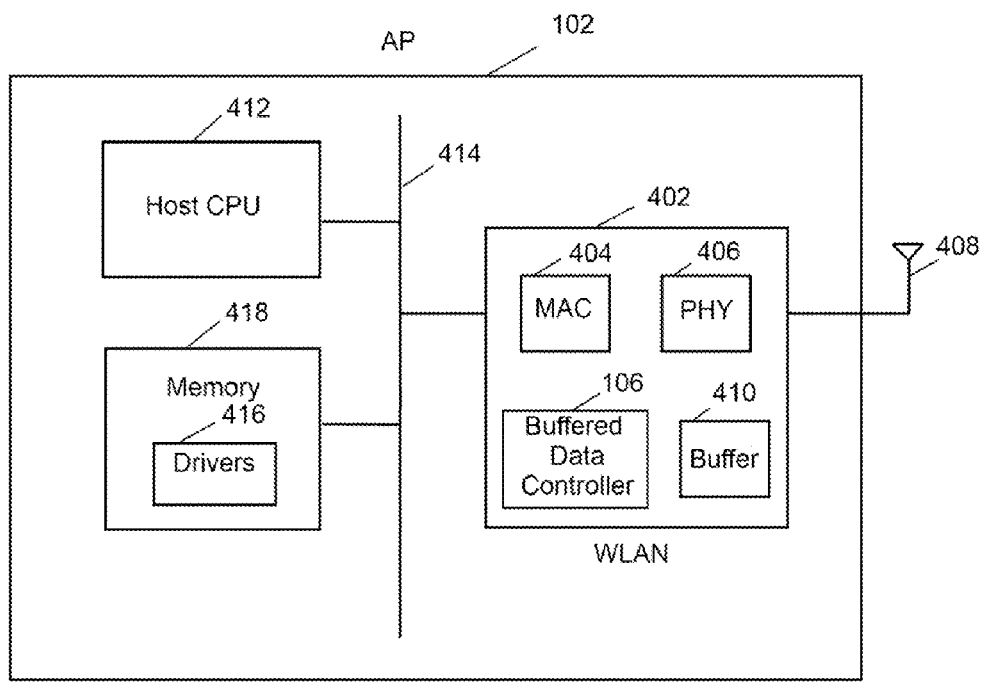
FIG. 4 schematically depicts functional blocks of an access point, according to one embodiment.

Turning now to FIG. 4, one embodiment of AP 102 is depicted showing principle functional blocks in a high level schematic diagram. Generally, AP 102 may employ an architecture in which the lower levels of the WLAN protocol stack are implemented through firmware and/or hardware in WLAN module 402. WLAN module 402 may therefore include media access controller (MAC) 404 that performs functions related to the handling and processing of frames of data including verification, acknowledgment, routing, formatting and the like. Incoming and outgoing frames are exchanged between MAC 404 and physical layer (PHY) 406, which may include the functions of modulating the frames according to the relevant 802.11 protocol as well as providing the analog processing and RF conversion necessary to provide transmission and reception of wireless signals through antenna 408. While only one antenna 408 is shown for illustration purposes, the AP 102 may include multiple antennas for use in, e.g., transmitting (and/or receiving) multiple outputs (and inputs). WLAN module 402 may also include buffer 410 for storing frames pending transmission to STA 104. In other embodiments, buffered data may be stored in any suitable location of AP 102.

AP 102 may also include host CPU 412 configured to perform the various computations and operations involved with the functioning of AP 102. Host CPU 412 is coupled to WLAN module 402 through bus 414, which may be implemented as a peripheral component interconnect express (PCIe) bus, a universal serial bus (USB), a universal asynchronous receiver/transmitter (UART) serial bus, a suitable advanced microcontroller bus architecture (AMBA) interface, a serial digital input output (SDIO) bus, or other equivalent interface. Upper layers of the protocol stacks of the WLAN system may be implemented in software as Drivers 416 stored in memory 418 that may be accessed by host CPU 412 over bus 414.

In one aspect, buffered data controller 106 may be implemented in WLAN module 402 as shown, such as at the MAC 404 layer and may be configured to employ the More Data bit to signal whether additional buffered data frames are pending as described above. In other embodiments, it may be desirable to implement buffered data controller 106 as processor-readable instructions stored in memory 418 that may be executed by host CPU 410.

Figure 5:
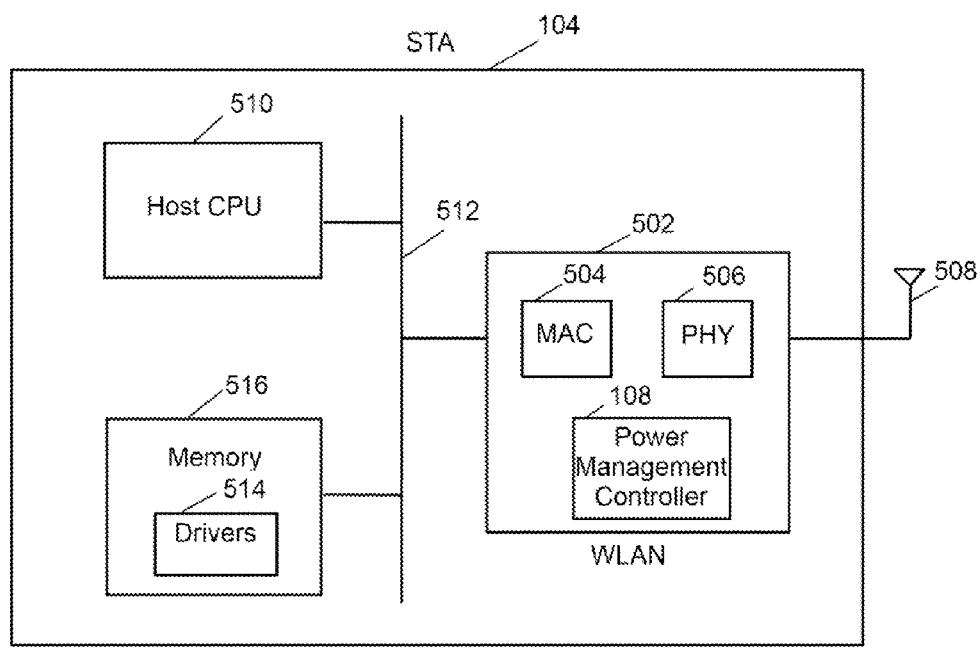
FIG. 5 schematically depicts functional blocks of a station, according to one embodiment.

In another aspect, one embodiment of STA 104 is depicted in FIG. 5, showing principle functional blocks in a high level schematic diagram. Generally, STA 104 may also employ a similar architecture in which WLAN module 502 includes MAC 504 and PHY 506 coupled to antenna 508. Similar to AP 102, while only one antenna 508 is shown for illustration purposes, STA 104 may include multiple antennas for use in, e.g., receiving multiple inputs. Likewise, STA 104 may include host CPU 510 configured to perform the various computations and operations involved with the functioning of STA 104. Accordingly, host CPU 510 may be coupled to WLAN module 502 through bus 512, as described similarly for AP 102. Upper layers of the protocol stacks of the WLAN system may be implemented in software as Drivers 514 stored in memory 516 that may be accessed by host CPU 510 over bus 512.

Power management controller 108 may be configured to determine from More Data bit 212 (e.g., FIG. 2) of a received data frame whether additional buffered data frames are pending delivery from AP 102. In one embodiment, power management controller 108 may be implemented in WLAN module 502, using any desired combination of firmware, hardware and/or software, such as at the MAC 504 layer. In other embodiments, power management controller 108 may be implemented by other functional blocks of STA 102, such as in processor-readable instructions stored in memory 516 that may be executed by host CPU 510.

Figure 6:
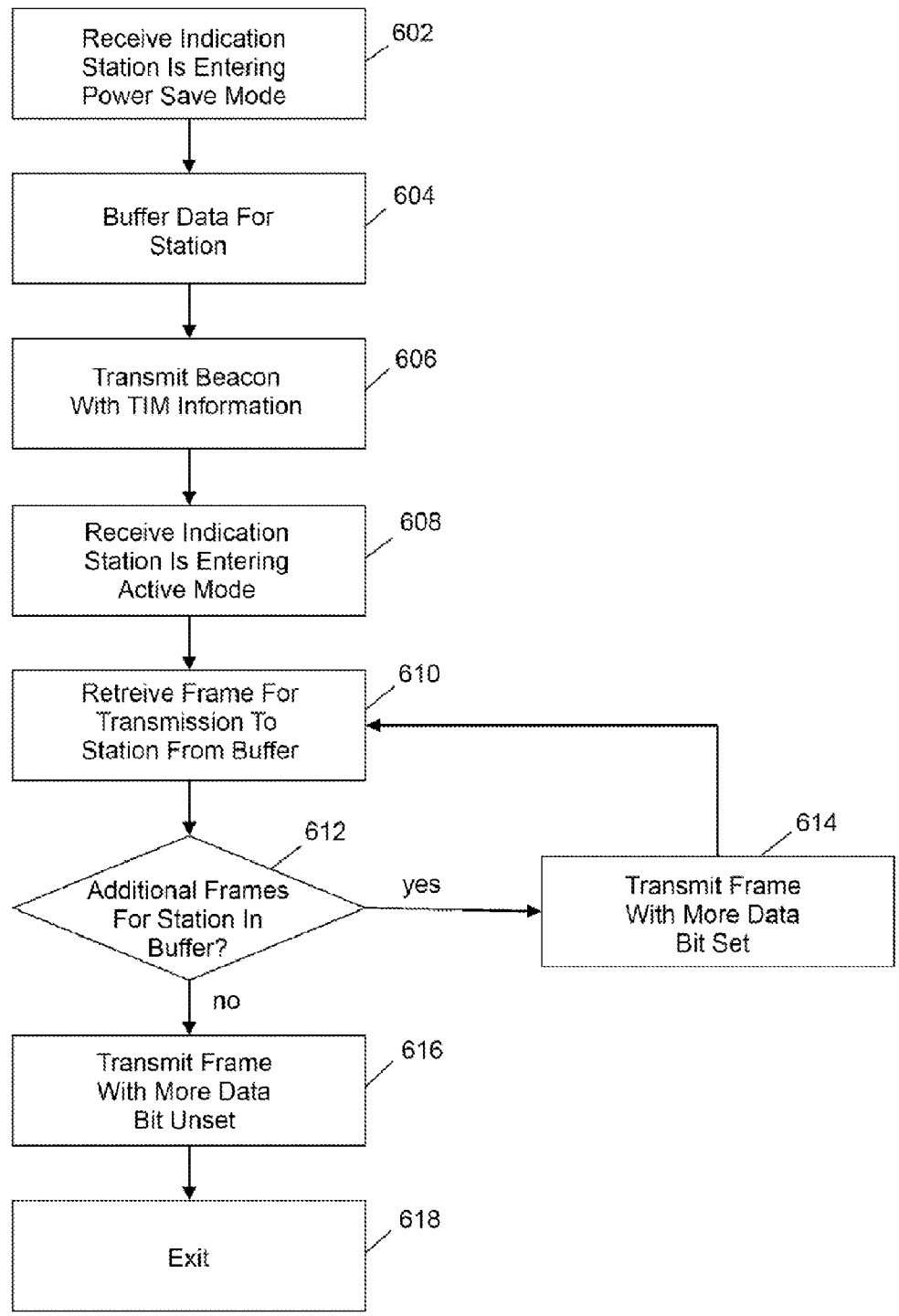
FIG. 6 is a flowchart showing an exemplary routine for an access point to facilitate power management, according to one embodiment.

One suitable example of the techniques of this disclosure for facilitating power management of STA 104 from the context AP 102 is depicted in reference to the flowchart of FIG. 6. As shown, the routine may begin at 602 with AP 102 receiving an indication that STA 104 is entering power save mode. In 604, AP 102 buffers data to be delivered to STA 104. At a designated time, such as the TBTT, AP 102 transmits a beacon frame having TIM information indicating that buffered data is pending delivery to STA 104 as indicated by 606. Upon receiving a frame signaling that STA 104 has entered active mode in 608, AP 102 may then retrieve a frame for transmission to STA 104 from buffer 410 in 610. In 612, buffered data controller 106 determines if buffer 410 has additional data frames for STA 104. If so, buffered data controller 106 causes the More Data bit to be set and AP 102 transmits the frame in 614. The routine then returns to 608 and the next frame is retrieved from buffer 410. If not, buffered data controller 106 causes the More Data bit to be unset and AP 102 transmits the frame in 616. Since all buffered data has been transmitted, the routine may then exit as indicated by 618.

Figure 7:
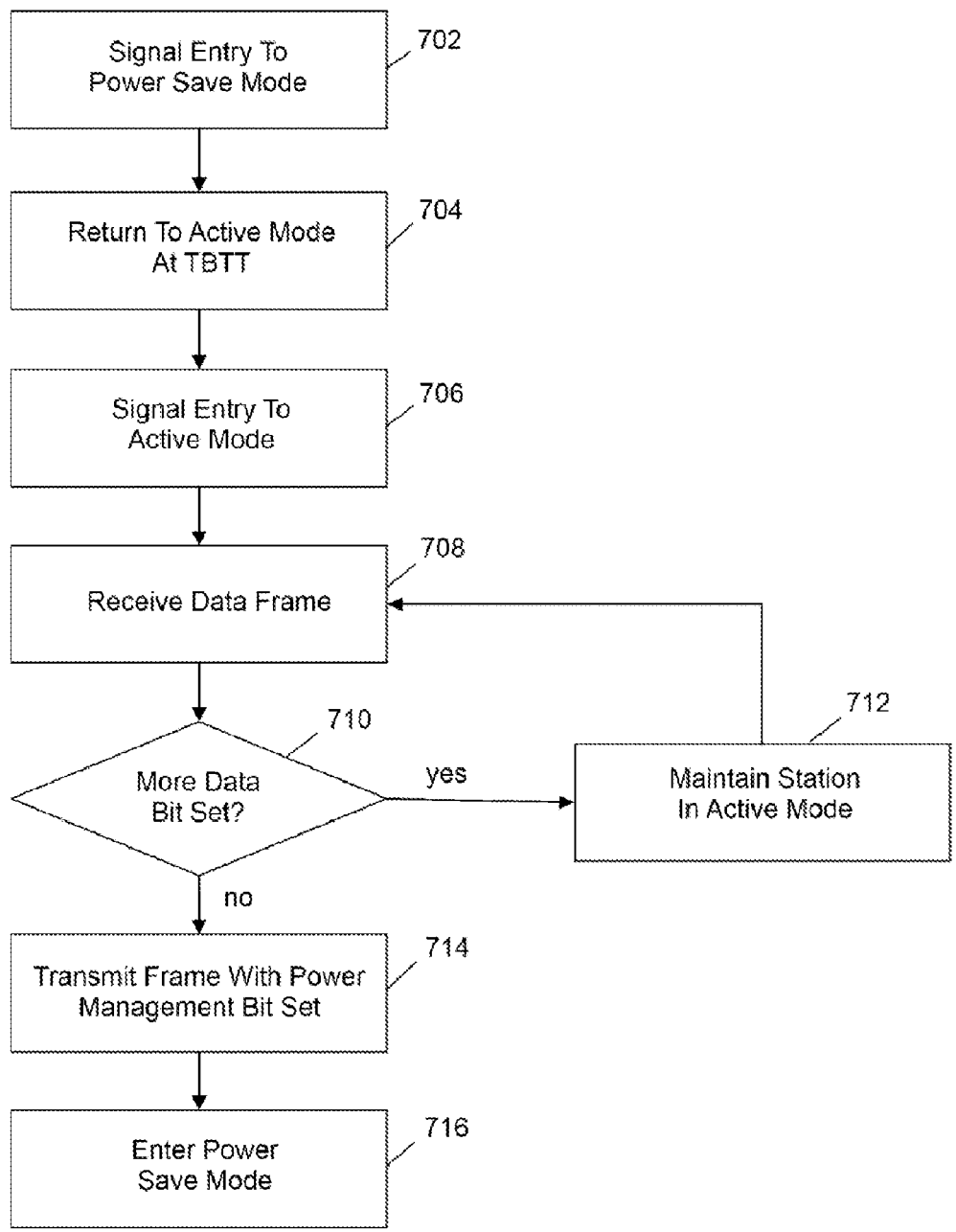
FIG. 7 is a flowchart showing an exemplary routine for a station to facilitate power management, according to one embodiment.

Another suitable example of the techniques of this disclosure for facilitating power management of STA 104 from the context STA 104 is depicted in reference to the flowchart of FIG. 7. As shown, the routine may begin at 702 with STA 104 signaling AP 102 that it is entering power save mode, such as by transmitting a frame with the power management bit set. In 704, STA 104 may return to active mode, such as before the TBTT, to receive a beacon frame with TIM information. If the TIM information indicates data has been buffered for STA 104, STA 104 may transmit a change in power management state to AP 102 in 706, such as by sending a null frame with the power management bit unset. In 708, STA 104 may receive a data frame transmitted by AP 102. Power management controller 108 determines if additional frames are pending as indicated by 710, such as by reading the More Data bit. If the More Data bit is set, power management controller 108 may maintain STA 104 in active mode in 712 and the routine may return to 708 for receipt of the additional data frames. If not, power management controller 108 may cause STA 104 to indicate a change in power management with AP 102, such as by transmitting a frame with the power management bit set in 714. Power management controller 108 may then cause STA 104 to enter power save mode, ending the routine in 716.

In the embodiments discussed above, the techniques of this disclosure have been applied in the context of a station operating in power save mode. In other embodiments, the techniques may be applied to any suitable use case as desired. For example, AP 102 may buffer data for STA 104 in response to a network condition, such as when congestion exceeds a threshold or when AP 102 is transmitting to another station. As such, AP 102 may initiate transfer of the buffered data in response to a change in the network condition rather than a change in power management state of STA 104, as AP 102 may consider STA 104 to remain in active mode throughout. In a similar manner, receipt of the terminal frame including the no more data indication allows STA 104 to enter power save mode without waiting for any timeout period and without risking missing a transmission from AP 102.

As desired, AP 102 may be configured to advertise capabilities associated with this disclosure in any suitable manner, including through the use of an IE in a management frame. Alternatively or additionally, STA 104 may be configured to infer AP 102 has such capabilities when AP 102 transmits a frame including the more data indication after STA 104 has indicated that it is in active mode.

Described herein are certain exemplary embodiments. However, one skilled in the art that pertains to the present embodiments will understand that the principles of this disclosure can be extended easily with appropriate modifications to other applications.

What is claimed is:

1. A method for managing power states in a wireless local area network (WLAN) that includes a first node configured to operate as an access point and a second node configured to operate as a station, comprising:
   storing a plurality of data frames from any source in a buffer at the first node for subsequent transmission to the second node;
   determining by the first node that the second node is in active mode; and
   transmitting the plurality of data frames without being polled by the first node between each frame, wherein the plurality of data frames includes a terminal frame having a no more data indication when no additional frames for the second node are stored in the buffer.

2. The method of claim 1, further comprising transmitting the plurality of data frames except the terminal data frame with a more data indication.

3. The method of claim 1, wherein the first node buffers data for the second node in response to at least one of receiving a power management indication that the second node is in power save mode and a network condition.

4. The method of claim 1, further comprising transmitting a beacon frame having information indicating availability of buffered data for the second node prior to determining that the second node is in active mode.

5. The method of claim 4, further comprising receiving a power management indication from the second node at the first node signaling that the second node is in active mode.

6. A wireless communications device configured to operate as an access point in a wireless local area network (WLAN), comprising a WLAN transceiver, a buffer and a buffered data controller, wherein:
   the wireless communications device to store a plurality of data frames from any source in the buffer for subsequent transmission to a first node;
   the wireless communications device to determine the first node is in active mode; and
   the WLAN transceiver to transmit the plurality of data frames without being polled by the first node between each frame, wherein the plurality of data frames includes a terminal frame having a no more data indication when the buffered data controller determines no additional frames for the first node are stored in the buffer.

7. The wireless communications device of claim 6, the WLAN transceiver further to transmit the plurality of data frames except the terminal data frame with a more data indication.

8. The wireless communications device of claim 7, wherein the more data indication comprises a set More Data bit and the no more data indication comprises an unset More Data bit.

9. The wireless communications device of claim 6, wherein the wireless communications device to buffer data for the first node in response to at least one of receiving a power management indication that the first node is in power save mode and a network condition.

10. The wireless communications device of claim 6, wherein the WLAN transceiver to transmit a beacon frame having information indicating availability of buffered data for the first node prior to the wireless communications device determining the first node is in active mode.

11. The wireless communications device of claim 10, wherein the WLAN transceiver further to receive a power management indication from the first node signaling that the first node is in active mode.

12. A non-transitory processor-readable storage medium for operating a wireless communications device as an access point in a wireless local area network (WLAN), the processor-readable storage medium having instructions thereon, when executed by a processor to cause the wireless communications device to:
   store a plurality of data frames from any source in a buffer for subsequent transmission to a first node;
   determine that the first node is in active mode; and
   transmit the plurality of data frames without being polled by the first node between each frame, wherein the plurality of data frames includes a terminal frame having a no more data indication when no additional frames for the first node are stored in the buffer.

13. The storage medium of claim 12, further comprising instructions to cause the wireless communications device to transmit the plurality of data frames except the terminal data frame with a more data indication prior to transmitting the first data frame.

14. The storage medium of claim 13, wherein the more data indication comprises a set More Data bit and the no more data indication comprises an unset More Data bit.

15. The storage medium of claim 12, wherein the instructions to store the plurality of data frames comprise instructions to buffer data for the first node in response to at least one of receiving a power management indication that the first node is in power save mode and a network condition.

16. The storage medium of claim 12, further comprising instructions to cause the wireless communications device to transmit a beacon frame having information indicating availability of buffered data for the second node prior to determining that the first node is in active mode.

17. The storage medium of claim 16, wherein the instructions to cause the wireless communications device to transmit the plurality of data frames cause the transmission in response to the wireless communications device receiving a power management indication signaling that the first node is in active mode.

\* \* \* \* \*